May 4, 1954  C. S. GRIMSHAW  2,677,242
SECONDARY REFRIGERATION CONTROL SYSTEM
Filed Jan. 31, 1952  3 Sheets-Sheet 1
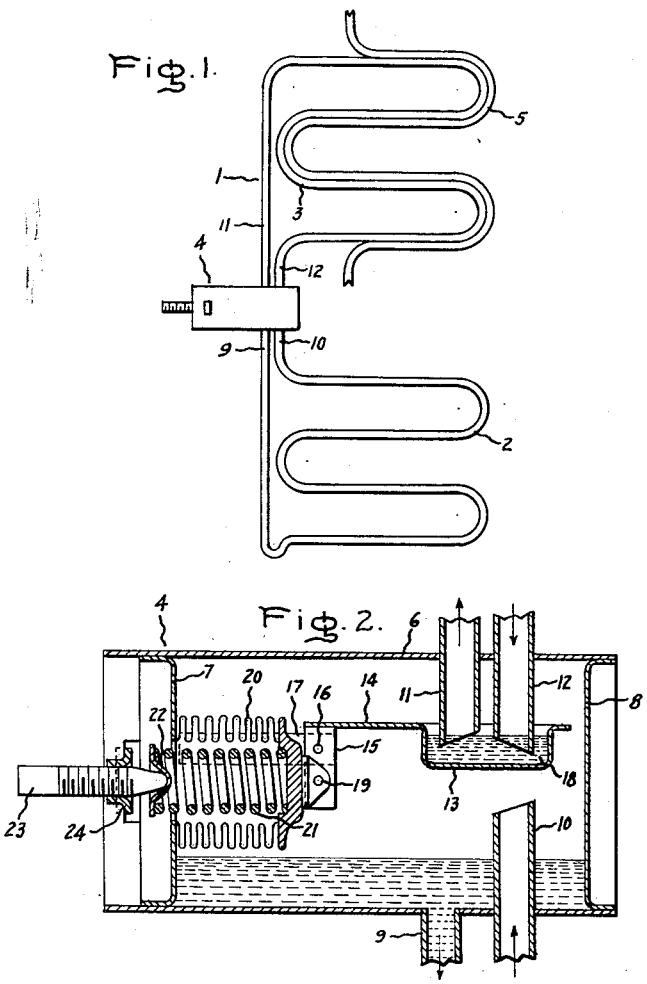
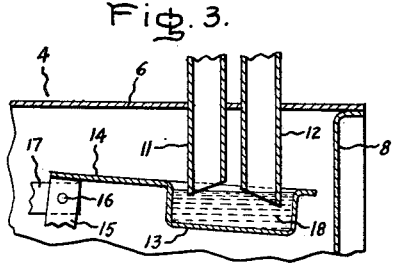
Inventor:
Charles S. Grimshaw,
by His Attorney.

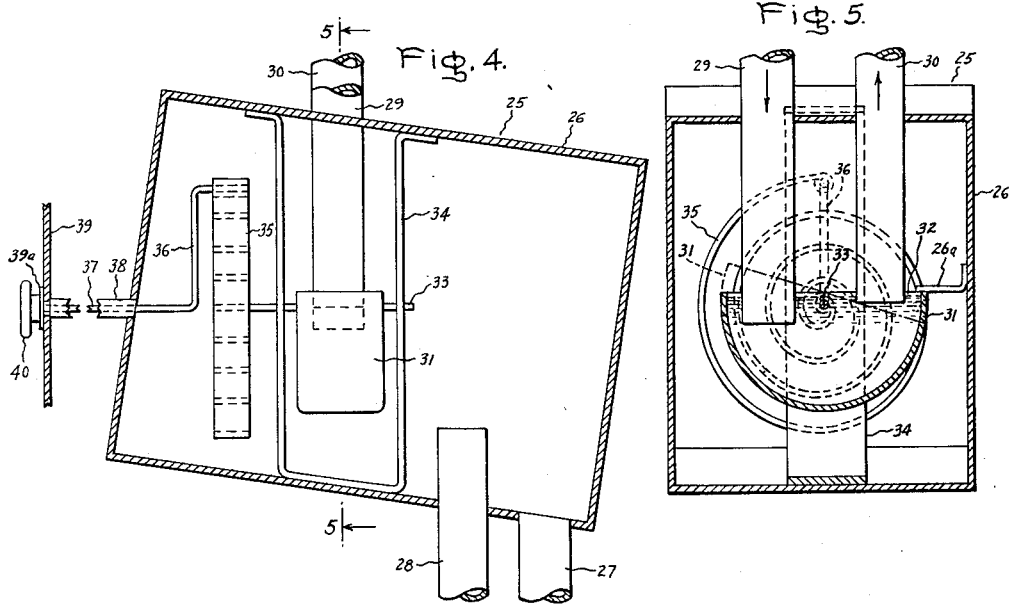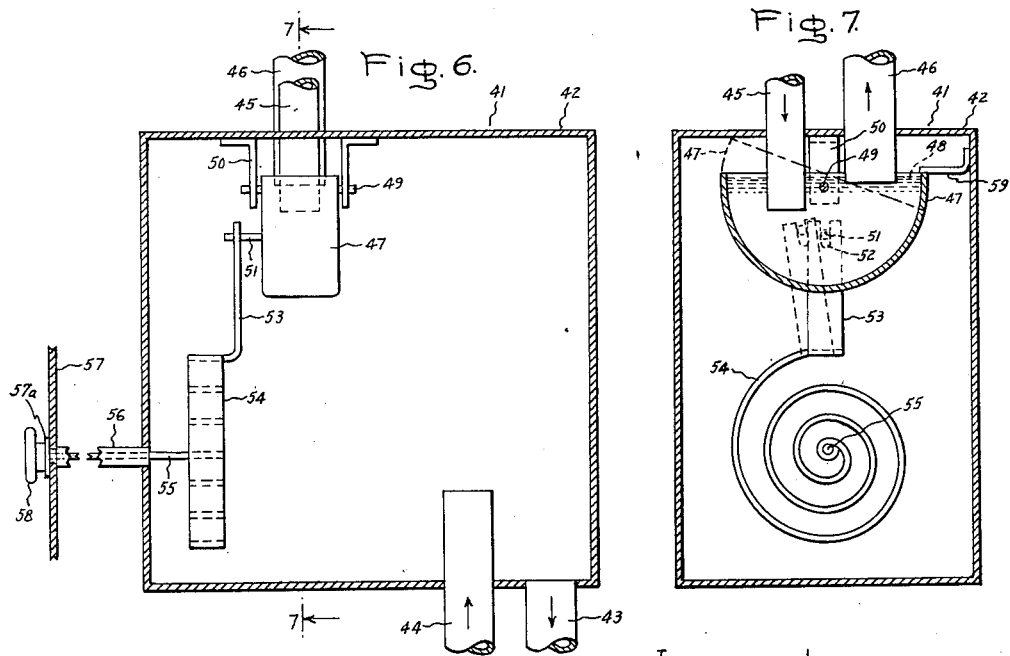

May 4, 1954
C. S. GRIMSHAW
2,677,242
SECONDARY REFRIGERATION CONTROL SYSTEM
Filed Jan. 31, 1952
3 Sheets-Sheet 3
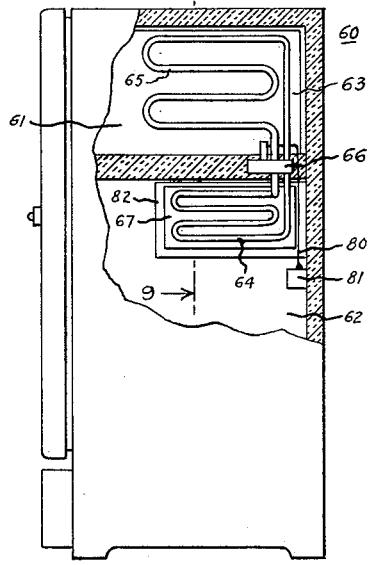
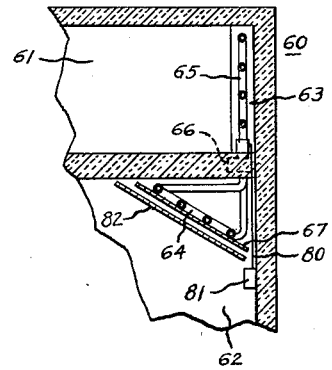
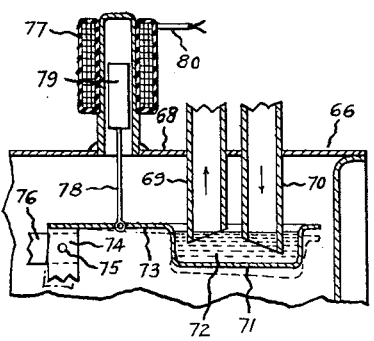
Inventor:
Charles S. Grimshaw,
by
His Attorney.

Patented May 4, 1954

2,677,242

UNITED STATES PATENT OFFICE 2,677,242

SECONDARY REFRIGERATION CONTROL SYSTEM

Charles S. Grimshaw, Erie, Pa., assignor to General Electric Company, a corporation of New York Application January 31, 1952, Serial No. 269,259

5 Claims. (Cl. 62—2)

1

My invention relates to refrigeration apparatus and pertains more particularly to secondary refrigerating systems.

A primary object of my invention is to provide in a secondary refrigerating system including a condenser and an evaporator, means for controlling the operation of the condenser for thereby controlling the temperature of the evaporator.

Another object of my invention is to provide in a secondary refrigerating system including a condenser and an evaporator, means responsive to conditions surrounding the evaporator for controlling the operation of the condenser and thereby controlling the temperature of the evaporator.

Another object of my invention is to provide a secondary refrigerating system adaptable for cooling the fresh food compartment in a two-temperature refrigerator, and including an improved arrangement for controlling operation of the condenser thereof in response to the temperature of the fresh food compartment whereby the evaporator of the system may be maintained at a substantially constant temperature immediately above freezing thereby to permit high humidity about the evaporator without the formation of frost thereon.

Another object of my invention is to provide a secondary refrigerating system employable as a humidity control in a refrigerator, and including an arrangement for controlling operation of the condenser thereof in response to humidity conditions in the refrigerator for freezing excessive moisture therein.

Still another object of my invention is to provide means for controlling the temperature of the evaporator in a secondary refrigerating system which is simple, inexpensively manufactured and reliable in operation.

Further objects and advantages of my invention will become apparent as the following description proceeds and the features of novelty which characterize my invention will be pointed out with particularity in the claims annexed to and forming a part of this specification.

In carrying out the objects of my invention, I provide a secondary refrigerating system including an evaporator and a condenser. Tubes to and from the condenser are connected to and extend into a refrigerant reservoir. Tubes to and from the evaporator are connected to the reservoir with the tube from the evaporator extending into the reservoir. Provided for cooperating with the condenser tubes is a receptacle. The receptacle is adapted to hold a supply of liquid refrigerant and is movable between one and another

2 other position. When the receptacle is in one position, the liquid refrigerant therein is effective for discontinuing the operation of the condenser to thereby stop the refrigeration process. When the receptacle is in the other position, the liquid in the receptacle permits operation of the condenser to thereby continue the refrigeration process. When the system is used for cooling a food compartment, I use a temperature responsive device for determining the position of the receptacle. When the system is used for controlling humidity, I use a humidity responsive device for determining the position of the receptacle.

For a better understanding of my invention reference may be had to the accompanying drawings in which Fig. 1 is a schematic illustration of a temperature controlling form of my invention;

Fig. 2 is an enlarged sectional view of the controlling device in the form shown in Fig. 1;

Fig. 3 is an enlarged fragmentary sectional view illustrating the receptacle in its lowered position;

Fig. 4 is a sectional view of a modified form of controlling device;

Fig. 5 is a section taken along the line 5—5 in Fig. 4;

Fig. 6 is a sectional view of another modified form of controlling device;

Fig. 7 is a section taken along the line 7—7 in Fig. 6;

Fig. 8 is a side elevation view, partly broken away, of a refrigerator including a humidity controlling form of my invention;

Fig. 9 is a section taken along the line 9—9 in Fig. 8; and

Fig. 10 is an enlarged fragmentary view illustrating receptacle positioning means in the humidity controlling form of my invention.

Referring to the drawings, I have shown in Fig. 1 a secondary refrigerating system 1 including an evaporator 2, a condenser 3 and one form of a controlling device 4. The condenser 3 is placed in heat exchange relationship with the evaporator 5 of a primary refrigerating system. The complete primary refrigerating system is not shown; and it is believed sufficient herein merely to point out that the heat exchange relationship between the condenser 3 of the secondary refrigerating system 1 and the evaporator 5 of the primary refrigerating system is such that all vaporous refrigerant received in the condenser 3 will be effectively condensed.

As seen in Fig. 2, the controlling device 4 includes a cylindrical refrigerant reservoir 6 having left and right-side head members 7 and 8, respectively. A tube portion 9 of the evaporator 2 connects the bottom side of the reservoir 6 with the inlet side of the evaporator. This connection permits liquid refrigerant to drain into and flood the evaporator 2 for providing a uniform evaporator temperature. Another tube portion 10 of the evaporator 2 connects the outlet side of the evaporator with the reservoir 6 for returning vaporous refrigerant and trapped liquid to the reservoir. In order to prevent drainage of liquid into the outlet side of the evaporator 2, the tube portion 10 is extended upwardly into the reservoir 6 to a point above the maximum level reached by liquid refrigerant therein, as shown in Fig. 2.

A tube portion 11 of the condenser 3 connects the inlet side of the condenser with the reservoir 6. Another tube portion 12 of the condenser 3 connects the outlet side of the condenser with the reservoir 6. Both of the tube portions 11 and 12 extend downwardly into the reservoir 6, with the latter extending slightly below the former.

Provided for cooperating with the tube portions 11 and 12 of the condenser 3 is a receptacle or pan 13. The pan 13 is formed to provide a sidewardly extending arm 14. Formed off the arm 14 is a pair of spaced apart pendent arms 15, only one of which is shown. Extending between the pendent arms 15 is a pin 16. The pin 16 is provided for pivotally mounting the pan 13 between a pair of spaced apart extension arms 17 secured to the left-side head member 7, and only one of which is shown.

The pan 13 is adapted to hold a supply of liquid refrigerant indicated by 18 in Fig. 2. When the pan is in a raised position, as shown in Fig. 2, the liquid refrigerant therein is effective for closing the ends of both of the tube portions 11 and 12 of the condenser 3. When the pan is in a lowered position, as shown in Fig. 3, the liquid refrigerant therein is effective for closing only the tube portion 12 of the condenser 3.

Pivotally connected to the pan 13 between the pendent arms 15 and by a pin 19 is a portion of a bellows 20. The bellows 20 is connected with the atmosphere and tends to remain expanded for maintaining the pan 13 in the raised position of Fig. 2. When refrigerant pressure in the reservoir 6 increases sufficiently, the bellows 20 contracts and causes the pan 13 to be moved to the lowered position of Fig. 3.

Housed in and cooperating with the bellows 20 is a compression spring 21. Associated with the outer end of the spring 21 is a spring seat 22. Cooperating with the spring seat 22 is an adjusting screw 23. The adjusting screw 23 is threaded in a keeper 24 suitably connected to the reservoir 6 on the outer side of the left-side head member 7. With this arrangement it is possible by turning the screw 23 to adjust the bellows 20 and thereby determine the refrigerant pressure required in the reservoir 6 to effect the contraction of the bellows. Through such an adjustment it is possible to set selectively the controlling device 4 for maintaining a predetermined evaporator temperature.

When the temperature of the evaporator 2 decreases and approaches the temperature for which the controlling device is set, the refrigerant pressure in the reservoir 6 is low and the bellows 20 is expanded. The expanded bellows is effective for maintaining the pan 13 in the raised position thereof shown in Fig. 2. When the pan is so positioned, the ends of the tube portions 11 and 12 of the condenser 3 are closed by the liquid refrigerant in the pan and condensed refrigerant is thereby prevented from escaping from the condenser. Vaporous refrigerant already in the condenser 3 is caused to be condensed and sub-cooled through the heat exchange relationship between the condenser 3 and the evaporator 5 of the primary refrigerating system. The refrigerant, in condensing, effects a decrease of pressure in the condenser 3. This decrease of pressure in the condenser 3 causes liquid in the pan 13 to be drawn up into the condenser, thereby lowering the level of the liquid in the pan below the end of the shorter tube 11. Thus, vaporous refrigerant is permitted to enter the condenser 3 through the tube 11. This results in some small flow of condensed liquid from the condenser 3 which raises the level of the liquid in the pan 13 for again closing the ends of both tubes 11 and 12. The newly admitted vaporous refrigerant in the condenser 3 is condensed and the pressure in the condenser again decreases; and again liquid in the pan 13 is drawn up into the condenser to thereby lower the level thereof below the end of the shorter tube 11. Again more vaporous refrigerant is permitted to flow through the tube 11 to the condenser 3. This repetitious process continues until the condenser 3 is filled with sub-cooled liquid refrigerant and is incapable of receiving and condensing any more vaporous refrigerant. In this manner, the operation of the condenser 3 is discontinued and the refrigeration process is thereby stopped. Thus, the temperature of the evaporator 2 is prevented from falling below the temperature for which the device 4 is set.

Some heat exchange continues to take place between the food compartment and the evaporator 2 whereby the refrigerant therein continues to be vaporized. The vaporous refrigerant is returned to the reservoir 6 through the tube portion 10 of the evaporator 2. Subsequently, due to the stopping of the refrigeration process resulting from inability of the condenser to remove the vapor, the pressure and temperature of the evaporator 2 increases. This results in an increased pressure in the reservoir 6 which finally becomes sufficient to contract the bellows 20. Contraction of the bellows 20 causes the pan 13 to be moved to the lowered position thereof shown in Fig. 3. When the pan 13 is in this lowered position, the liquid refrigerant therein is effective for closing only the tube portion 12 of the condenser 3. Vaporous refrigerant is admitted into the tube portion 11 of the condenser 3 which causes the condensed refrigerant therein to flow through the tube portion 12 and into the pan 13. The liquid refrigerant overflows from the pan 13 into the bottom portion of the reservoir 6 for drainage into the evaporator 2. The admission of vaporous refrigerant into the tube portion 11 of the condenser 3 and the resultant condensation thereof in the condenser is effective for continuing the refrigeration process to lower the pressure and temperature of the evaporator 2. As the temperature of the evaporator 2 and, therefore, the fresh food compartment decreases, the pressure in the reservoir 6 is decreased. The decreased pressure in the reservoir 6 is effective for permitting the bellows 20 to expand, whereby the pan 13 is moved to its raised position for again stopping the refrigeration process in the manner and for the purpose above-described.

It will be seen that in the just described form of my invention the temperature of the evaporator 2 will be uniform. Also, by means of the adjusting screw 23 the controlling device 4 may be set for maintaining the temperature of the evaporator substantially constantly just above freezing. Thus, high humidity air may circulate in the fresh food compartment and about the evaporator without resulting in frost forming on the lining of said compartment or on said evaporator.

Also, it is to be understood that various means other than the bellows 20 could be effectively employed for positioning the pan 13 in response to temperature changes. For instance, the increase in pressure in the reservoir 6, effected by increased temperature about the evaporator 2, could be effectively utilized with a diaphragm or a Bourdon tube for obtaining the pan positioning movements. Also, the pan positioning movements could be obtained magnetically. For instance, a permanent magnet could be secured in the housing 6 above the arm 14 on the pan 13 and a Curie metal could be attached to the arm 14. As the temperature varied the magnetic susceptibility of the Curie metal would vary, thereby affecting attraction between it and the permanent magnet and resulting in temperature responsive movements of the pan.

In Figs. 4 and 5 I have shown a modified temperature responsive controlling device generally designated 25 and including a refrigerant reservoir 26. A tube 27 connects the bottom of the reservoir 26 with the inlet side of an evaporator which is not shown. This connection permits drainage of liquid refrigerant from the reservoir to the evaporator. Another tube 28 connects the outlet side of the evaporator with the reservoir and extends upwardly thereinto for returning vaporous refrigerant. At the top of the reservoir 26 a tube 29 connects the outlet side of a condenser which is not shown with the refrigerator. The inlet side of the condenser is connected to the reservoir by a tube 30. Both of the tubes 29 and 30 extend downwardly into the reservoir 26 with the former extending slightly below the latter.

Cooperating with the tubes 29 and 30 is a substantially semi-cylindrical receptacle 31. The receptacle 31 is adapted to hold a supply of liquid refrigerant indicated by 32 in Fig. 5. When the receptacle is level, as shown in solid lines in Fig. 5, the liquid refrigerant 32 is effective for closing the ends of both of the tubes 29 and 30. This causes the operation of the condenser to be discontinued and the refrigeration process to stop in the manner and for the purpose above described. When the receptacle 31 is rotated clockwise or tilted to the position shown in dash lines in Fig. 5, the liquid refrigerant therein is effective for closing the end of only the tube 29 whereby vaporous refrigerant is admitted into the condenser through the tube 30 and operation of the condenser and the refrigeration process are continued.

Secured in the receptacle 31 and passing through its center of gravity and center of rotation is a pivot pin 33. The pin 33 extends from either side of the receptacle 31 and is journaled between the arms of a bracket 34 suitably secured in the reservoir. In this arrangement, the receptacle 31 has practically no reaction torque and the pin can be satisfactorily journaled in very small bearings. Consequently, a small amount of energy is required to rotate or tilt the receptacle 31. Provided for cooperating with the receptacle 31 to determine the position thereof, is a spiral bimetal 35 which contracts or tends to wind when cold and expands or unwinds when heated. The spiral bimetal 35 is secured at its inner end to one end of the pivot pin 33. The outer end of the spiral bimetal 35 is connected to a crank arm 36 formed on one end of a wire 37. In this arrangement, the outer end of the bimetal is held relatively still and expansion and contraction of the bimetal results in rotative movements at the center or inner end thereof.

When the temperature of the evaporator is low, the temperature in the reservoir 26 is low and the spiral bimetal 35 is contracted, thus causing the receptacle 31 to be positioned level, against a stop 26a. The stop 26a prevents the bimetal from contracting excessively and tilting the receptacle counterclockwise if the system is placed in an ambient lower than the normal controlling low temperature thereof. When the receptacle 31 is positioned level, the ends of the tubes 29 and 30 are closed and the refrigeration process is stopped. Subsequently, the discontinuation of the refrigeration process causes the evaporator and reservoir to become heated. The heat causes the spiral bimetal to expand or unwind whereby the receptacle 31 is rotated clockwise or tilted to the dash line position. This results in the opening of the end of the tube 30 and continuation of the refrigeration process to lower the temperature of the evaporator. When the evaporator becomes sufficiently cold the bimetal will again contract and move the receptacle to the level position.

The wire 37 passes through the side of the reservoir 26 and extends through a small diameter control tube 38. The control tube 38 extends through and beyond a front wall 39 of a refrigerator. The outer end of the control tube 38 is sealed to prevent leakage from the reservoir 26 and the outer end of the wire 37 is secured to the outer end of the control tube. On the outer side of the front wall 39 an adjustment knob 40 is secured to the tube 38. A friction pad 39a secured to the outer side of the front wall 39 and having the control tube 38 passing therethrough cooperates with the adjustment knob 40. By turning the adjustment knob 40, the tube 38 is distorted rotationally. The control tube 38 is formed preferably of an elastic material and the friction pad 39a permits it to be set at different degrees of distortion. Distortion of the outer end of the tube 38 in the manner just described displaces the wire 37 angularly. Angular displacement of the wire 37 effects angular displacement of the spiral bimetal 35 and the receptacle 31. It will be seen that by turning the adjustment knob 40 the spiral bimetal 35 and the receptacle 31 may be adjustably positioned for varying the distance between the surface of the liquid refrigerant 32 in the receptacle 31 and the end of the tube 30 to the condenser. In this manner the temperature at which the spiral bimetal 35 effects opening and closing of the tube 30 to the condenser may be determined and the control device 25 may be preset for maintaining a desired evaporator temperature.

The control tube 38 may be formed of a malleable material, in which case it would take a set upon being distorted and the friction pad 39a would not be required.

Figs. 6 and 7 illustrate another modification of a temperature responsive controlling device which is generally designated 41 and includes a reservoir 42. This form further includes tubes 43 and 44 for connection to the inlet and outlet sides, respectively, of an evaporator (not shown). A tube 45 connects the outlet side of a condenser (also not shown) with the top of the reservoir 42. The inlet side of the condenser is connected to the top of the reservoir by a tube 46. Both of the tubes 45 and 46 extend downwardly into the reservoir with the former extending slightly below the latter.

Provided for cooperating with the tubes 45 and 46 is a substantially semi-cylindrical receptacle 47. The receptacle 47 holds a supply of liquid refrigerant indicated by 48 in Fig. 7. When the receptacle 47 is level, as shown in solid lines in Fig. 7, the liquid refrigerant 48 closes the ends of the tubes 45 and 46 and the refrigeration process is thereby stopped. When the receptacle 47 is rotated clockwise or tilted to the position shown in dash lines in Fig. 7, the liquid refrigerant therein is effective for closing only the tube 45 from the condenser and the refrigeration process is continued.

In this form the receptacle 47 is rotatable on a pivot pin 49 which passes through its center of gravity and center of rotation. The pivot pin 49 is secured between a pair of brackets 50 attached to the top of the reservoir. Provided on the receptacle 47 is a forwardly extending pin 51. The pin 51 is positioned in a notch 52 formed in the extremity of an arm 53 formed off the outer end of a spiral bimetal 54. The spiral bimetal 54, which is also of the type that contracts or winds when cold and expands or unwinds when heated, is secured at its inner end on a wire 55. In this arrangement the inner end of the spiral bimetal 54 is held relatively still and expansion and contraction of the bimetal results in substantially linear movements of the outer end of the arm 53.

When the temperature of the evaporator is low, the temperature in the reservoir 42 is low and the spiral bimetal 54 is contracted. When contracted, the bimetal is effective for maintaining the receptacle 47 in the level position against a stop 59. This closes the ends of the tubes 45 and 46 and stops the refrigeration process. Subsequently, the discontinuation of the refrigeration process causes the evaporator and reservoir to become heated. The heat causes the bimetal to expand or unwind whereby the arm 53 is moved to the dash line position in Fig. 7 and is effective for rotating the receptacle 47 clockwise or tilting it to the dash line position thereof. This action opens the end of the tube 46 and the refrigeration process is thereby continued for lowering the temperature of the evaporator. The spiral bimetal 54 contracts and moves the receptacle to its level position when the evaporator again becomes sufficiently cold.

The wire 55 extends through a side of the reservoir 42 and passes through a small diameter control tube 56. The control tube 56 extends through and beyond a front wall 57 of a refrigerator. The outer end of the control tube 56 is sealed to prevent leakage from the reservoir and the outer end of the wire 55 is secured to the outer end of the tube. On the outer side of the wall 57 an adjustment knob 58 is secured to the tube 56. A friction pad 57a secured to the outer side of the front wall 57 and having the control tube 56 passing therethrough cooperates with the adjustment knob 58. Turning of the adjustment knob 58 distorts the outer end of the tube rotationally which results in the wire 55 being displaced angularly. Angular displacement of the wire 55 effects angular displacement of the bimetal 54 and the receptacle 47. The control tube 56 is formed preferably of an elastic material and the friction pad 57a cooperating with the knob 58 permits the tube 56 to be set at different degrees of distortion. This permits the spiral bimetal 54 and the receptacle 47 to be positioned adjustably whereby the controlling device 41 may be set for maintaining a desired evaporator temperature.

In this embodiment also, the control tube 56 may be formed of a malleable material which would take a set upon being distorted and would obviate the need for the friction pad 57a.

It is to be understood that while I have employed in the last two described modifications spiral bimetals which contract when cold and expand when heated, spiral bimetals which expand when cold and contract when heated could be utilized for obtaining the required receptacle positioning movements.

Also, a bimetal could be employed for making and breaking a circuit in response to temperature changes. The circuit could include the coil of a solenoid and the solenoid could be utilized for effecting the required pan movements in the manner shown in Fig. 10.

In Figs. 8 and 9 I have shown a refrigerator 60 including a freezer 61 and a fresh food compartment 62. In the refrigerator 60 I have included a secondary refrigerating system 63 adapted for controlling humidity in the fresh food compartment 62 by freezing excess moisture. The system 63 is similar to the first described form of my invention in that it includes an evaporator 64, a condenser 65, and a controlling device 66. The evaporator 64 is secured to a cold plate 67 in the fresh food compartment 62 and the condenser 65 is placed in heat exchange relationship with the freezer 61. The controlling device 66 is housed in the insulative wall between the freezer and fresh food compartments in the refrigerator and is similar to the controlling device 4 in the first described form of my invention.

The controlling device 66, as seen in Fig. 10, includes a refrigerant reservoir 68 having tubes 69 and 70 extending downwardly thereinto from the inlet and outlet sides, respectively, of the condenser 65. Cooperating with the ends of the tubes 69 and 70 is a receptacle or pan 71 adapted for holding a supply of liquid refrigerant, indicated by 72. The pan 71 is formed to provide an arm 73. Formed off the arm 73 is a pair of spaced apart pendent arms 74, only one of which is shown. Extending between the pendent arms 74 is a pin 75. The pin 75 pivotally mounts the pan 71 between a pair of spaced apart extension arms 76 secured to the side of the housing 68, and only one of which is shown.

Mounted on the housing 68 is a solenoid 77. A connector 78 connects the arm 73 of the pan 71 to the plunger 79 of the solenoid 77. By means of an electrical connection, indicated by 80, the coil in the solenoid 77 is included in a circuit controlled by a suitable humidity controlling device 81 which, as seen in Figs. 8 and 9, is located in the fresh food compartment 62.

When humidity in the compartment 62 is low, the humidity controlling device 81 causes the solenoid 77 to be energized whereby the plunger 79 holds the pan 71 in the raised position thereof shown in solid lines in Fig. 10. When the pan 71 is raised, the liquid 72 therein stops the refrigeration process in the same manner as described above. When humidity in the compartment 62 rises in excess of a predetermined amount, the humidity controlling device 81 opens the circuit in the solenoid 77 whereby the solenoid is deenergized and the pan 71 is permitted to fall to the lowered position thereof, indicated by dot and dash lines in Fig. 10, to continue the refrigeration process. In this manner humidity in the fresh food compartment is controlled by freezing excessive moisture and having it form as frost on the cold plate 67. In order to prevent undue cooling of the fresh food compartment during freezing of excessive moisture, I provide a radiation baffle 82 located below the cold plate 67.

It will be seen that the just described humidity controlling form of my invention is applicable to air-conditioning as well as refrigeration apparatus.

While I have shown particular embodiments of my invention, I do not desire my invention to be limited to the particular forms shown and described and I intend by the appended claims to cover all modifications within the true spirit and scope of my invention.

What I claim as new and desire to secure by Letters Patent of the United States is:

1. In a secondary refrigerating system including an evaporator and a condenser, means for controlling the flow of refrigerant in said system and thereby controlling the temperature of said evaporator comprising a refrigerant reservoir, a tube to said evaporator being arranged to drain liquid refrigerant from said reservoir, a tube from said evaporator extending into said reservoir and effective for returning vaporous refrigerant and liquid thereto, a tube to said condenser being arranged to receive vaporous refrigerant from said reservoir, a tube from said condenser being arranged to conduct condensed refrigerant to said reservoir, said tubes to and from said condenser extending into said reservoir, a receptacle in said reservoir cooperating with said tubes to and from said condenser, said receptacle being adapted to hold a supply of liquid refrigerant, said receptacle being movable between one and another position, said liquid refrigerant in said receptacle being effective when said receptacle is in one position for closing the ends of said tubes to and from said condenser thereby to cause said condenser to become substantially filled with and to retain condensed refrigerant whereby the operation of said condenser is discontinued and the refrigeration process is stopped, said liquid refrigerant being effective when said receptacle is in the other position for closing the end of said tube from said condenser only whereby vaporous refrigerant is admitted into said tube to said condenser and the condensed refrigerant is permitted to flow from said tube from said condenser and into said reservoir for continuing the refrigeration process, a humidity controlled device located in the vicinity of said evaporator, a solenoid associated with said receptacle and controlled by said humidity controlled device whereby low humidity about said evaporator causes said receptacle to be maintained in said one position and high humidity causes said receptacle to be moved to said other position.

2. In a secondary refrigerating system including an evaporator and a condenser, means for controlling the flow of refrigerant in said system and thereby controlling the temperature of said evaporator comprising a refrigerant reservoir, a tube to said evaporator being arranged to drain liquid refrigerant from said reservoir, a tube from said evaporator extending into said reservoir above the maximum liquid level therein, said tube from said evaporator being effective for returning vaporous and liquid refrigerant to said reservoir, a tube to said condenser being arranged to receive vaporous refrigerant from said reservoir, a tube from said condenser being arranged to conduct condensed refrigerant to said reservoir, said tubes to and from said condenser extending into said reservoir, said tube from said condenser extending below said tube to said condenser, a receptacle pivotally mounted in said reservoir and cooperating with the tubes to and from said condenser, said receptacle being adapted to hold a supply of liquid refrigerant, said receptacle being movable between a raised and a lowered position, said liquid refrigerant in said receptacle being effective when said receptacle is in said raised position for closing the ends of said tubes to and from said condenser thereby to cause said condenser to become filled with and to retain condensed refrigerant whereby the refrigeration process is stopped, said liquid refrigerant being effective when said receptacle is in said lowered position for closing the end of the tube from said condenser only whereby vaporous refrigerant is admitted into said tube to said condenser and the condensed refrigerant is permitted to flow from said tube from said condenser and into said reservoir for continuing the refrigeration process, a solenoid associated with said receptacle, said solenoid being effective when energized for maintaining said receptacle in its raised position, said solenoid being effective when deenergized for permitting said receptacle to move to its lowered position, and a humidity controlled device located in the vicinity of said evaporator, said humidity controlled device being adapted to effect energization of said solenoid when humidity about said evaporator is low and to effect deenergization of said solenoid when said humidity is high.

3. In a secondary refrigerating system including an evaporator and a condenser, means for controlling the flow of refrigerant in said system and thereby controlling the temperature of said evaporator comprising a refrigerant reservoir, a tube to said evaporator being arranged to drain liquid refrigerant from said reservoir, a tube from said evaporator extending into said reservoir and effective for returning vaporous refrigerant and liquid thereto, a tube to said condenser being arranged to receive vaporous refrigerant from said reservoir, a tube from said condenser being arranged to conduct condensed refrigerant to said reservoir, said tubes to and from said condenser extending into said reservoir, a receptacle pivotally mounted in said reservoir cooperating with said tubes to and from said condenser, said receptacle being adapted to hold a supply of liquid refrigerant, said receptacle being movable between one and another position, said liquid refrigerant in said receptacle being effective when said receptacle is in one position for closing the ends of said tubes to and from said condenser thereby to cause said condenser to become substantially filled with and to retain condensed refrigerant whereby the operation of said condenser is discontinued and the refrigeration process is stopped, said liquid refrigerant being effective when said receptacle is in the other position for closing the end of the tube from said condenser only whereby vaporous refrigerant is admitted into said tube to said condenser and the condensed refrigerant is permitted to flow from said tube from said condenser and into said reservoir for continuing the refrigeration process, and a spiral bimetal associated with said receptacle and responsive to the temperature in said reservoir, said spiral bimetal being effective when temperature in said reservoir is low for maintaining said receptacle in said one position and said spiral bimetal being effective when the temperature in said reservoir increases for rotating said receptacle to said other position, a control tube connected to said reservoir, the outer end of said control tube being sealed, and a wire extending through said control tube, the outer end of said wire being secured to the outer end of said control tube, the inner end of said wire being associated with said spiral bimetal, rotational distortion of the outer end of said control tube effecting angular displacement of said wire, angular displacement of said wire adjustably positioning said spiral bimetal and said receptacle for varying the distance between said one position and said other position thereby to determine the temperature at which said spiral bimetal effectively moves said receptacle from said one position to said other position.

4. In a secondary refrigerating system including an evaporator and a condenser, means for controlling the flow of refrigerant in said system and thereby controlling the temperature of said evaporator comprising a refrigerant reservoir, a tube to said evaporator being arranged to drain liquid refrigerant from said reservoir, a tube from said evaporator extending into said reservoir above the maximum liquid level therein, said tube from said evaporator being effective for returning vaporous and liquid refrigerant to said reservoir, a tube to said condenser being arranged to receive vaporous refrigerant from said reservoir, a tube from said condenser being arranged to conduct condensed refrigerant to said reservoir, said tubes to and from said condenser extending into said reservoir, said tube from said condenser extending below said tube to said condenser, a receptacle rotatably mounted in said reservoir and cooperating with said tubes to and from said condenser, said receptacle being adapted to hold a supply of liquid refrigerant, said receptacle being rotatable between one position and another position, said liquid refrigerant in said receptacle being effective when said receptacle is in said one position for closing the ends of said tubes to and from said condenser thereby to cause said condenser to become filled with and to retain condensed refrigerant whereby the refrigeration process is stopped, said liquid refrigerant being effective when said receptacle is in said other position for closing the end of said tube from said condenser only whereby vaporous refrigerant is admitted into said tube to said condenser and the condensed refrigerant is permitted to flow from said tube from said condenser into said reservoir for continuing the refrigeration process, a spiral bimetal in said reservoir associated at the inner end thereof with said receptacle, a control tube connected to said reservoir, the outer end of said control tube being sealed, a wire extending through said control tube, the outer end of said wire being secured to the outer end of said control tube, the inner end of said wire being formed as a crank arm connected to the outer end of said spiral bimetal whereby said outer end of said spiral bimetal is held relatively still during heat responsive movements of said spiral bimetal, said spiral bimetal contracting when temperature in said reservoir is low for maintaining said receptacle in said one position and said spiral bimetal expanding when temperature in said reservoir increases for rotating said receptacle to said other position, and means at the outer end of said control tube whereby said control tube is rotationally and settably distortable, distortion of said tube effecting angular displacement of said wire, angular displacement of said wire adjustably positioning said spiral bimetal and said receptacle for varying the angular distance between said one position and said other position thereby to determine the temperature at which said spiral bimetal effectively moves said receptacle from said one position to said other position.

5. In a secondary refrigerating system including an evaporator and a condenser, means for controlling the flow of refrigerant in said system and thereby controlling the temperature of said evaporator comprising a refrigerant reservoir, a tube to said evaporator being arranged to drain liquid refrigerant from said reservoir, a tube from said evaporator extending into said reservoir above the maximum liquid level therein, said tube from said evaporator being effective for returning vaporous and liquid refrigerant to said reservoir, a tube to said condenser being arranged to receive vaporous refrigerant from said reservoir, a tube from said condenser being arranged to conduct condensed refrigerant to said reservoir, said tubes to and from said condenser extending into said reservoir, and said tube from said condenser extending below said tube to said condenser, a receptacle rotatably mounted in said reservoir and cooperating with said tubes to and from said condenser, said receptacle being adapted to hold a supply of liquid refrigerant, said receptacle being rotatable between one position and another position, said liquid refrigerant in said receptacle being effective when said receptacle is in said one position for closing the ends of said tubes to and from said condenser thereby to cause said condenser to become filled with and to retain condensed refrigerant whereby the refrigeration process is stopped, said liquid refrigerant being effective when said receptacle is in said other position for closing the end of said tube from said condenser only whereby vaporous refrigerant is admitted into said tube to said condenser and the condensed refrigerant is permitted to flow from said tube from said condenser into said reservoir for continuing the refrigeration process, a spiral bimetal in said reservoir associated at the outer end thereof with said receptacle, a control tube connected to said reservoir, the outer end of said control tube being sealed, a wire extending through said control tube, the outer end of said wire being secured to the outer end of said control tube, the inner end of said wire being connected to the inner end of said spiral bimetal whereby said inner end of said spiral bimetal is held relatively still during heat responsive movements of said spiral bimetal, said spiral bimetal contracting when temperature in said reservoir is low for maintaining said receptacle in said one position, said spiral bimetal expanding when temperature in said reservoir rises for rotating said receptacle to said other position, and means at the outer end of said control tube whereby said control tube is rotatably and settably distortable, distortion of said tube effecting angular displacement of said wire, angular displacement of said wire adjustably positioning said spiral bimetal and said receptacle for varying the angular distance between said one position and said other position thereby to determine the temperature at which said spiral bimetal effectively moves said receptacle from said one position to said other position.

References Cited in the file of this patent

UNITED STATES PATENTS

| Number | Name | Date |
|---|---|---|
| 2,433,187 | Alsing | Dec. 23, 1947 |
| 2,455,850 | Atchison | Dec. 7, 1948 |
| 2,500,778 | Tobey | Mar. 14, 1950 |
| 2,527,386 | Alsing | Oct. 24, 1950 |
| 2,604,741 | Atchison | July 29, 1952 |
| 2,607,200 | Shoemaker | Aug. 19, 1952 |